(12) United States Patent
Kang et al.

(10) Patent No.: US 10,527,910 B2
(45) Date of Patent: Jan. 7, 2020

(54) VEHICLE DRIVER ASSIST SYSTEM

(71) Applicant: TRW AUTOMOTIVE U.S. LLC, Livonia, MI (US)

(72) Inventors: Shaoying Kang, Ann Arbor, MI (US);
Michael A. Hart, Dexter, MI (US);
Harsh G. Shah, Southfield, MI (US);
Matthew M. Jazwiecki, Canton, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 78 days.

(21) Appl. No.: 15/689,102

(22) Filed: Aug. 29, 2017

(65) Prior Publication Data
US 2019/0064636 A1    Feb. 28, 2019

(51) Int. Cl.
| | |
|---|---|
| *G03B 17/00* | (2006.01) |
| *B62D 15/02* | (2006.01) |
| *H04N 5/225* | (2006.01) |
| *G06K 9/00* | (2006.01) |
| *G03B 11/04* | (2006.01) |
| *G03B 17/02* | (2006.01) |
| *G08G 1/16* | (2006.01) |

(52) U.S. Cl.
CPC ........... *G03B 17/00* (2013.01); *B62D 15/026* (2013.01); *G03B 11/045* (2013.01); *G03B 17/02* (2013.01); *G06K 9/00791* (2013.01); *H04N 5/2256* (2013.01); *B60W 2420/42* (2013.01); *G06T 2207/30252* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 6,746,126 B2 | 6/2004 | Scherber et al. | |
| 7,480,149 B2 * | 1/2009 | DeWard | B60R 11/04 340/438 |
| 9,193,308 B2 * | 11/2015 | Okuda | B60R 11/04 |
| 9,272,665 B2 * | 3/2016 | Minikey, Jr. | B60R 1/04 |
| 9,487,159 B2 | 11/2016 | Achenbach | |
| 9,487,161 B2 | 11/2016 | Rawlings et al. | |
| 2009/0295181 A1 * | 12/2009 | Lawlor | B60R 1/12 296/1.11 |
| 2010/0065707 A1 * | 3/2010 | Hansel | B60R 11/04 248/298.1 |
| 2013/0076905 A1 * | 3/2013 | Blake, III | B60R 11/00 348/148 |
| 2015/0097013 A1 * | 4/2015 | Rawlings | B60R 11/04 224/567 |

(Continued)

OTHER PUBLICATIONS

PCT/US2018/046158 Search Report and Written Opinion.

*Primary Examiner* — Fernando Alcon
(74) *Attorney, Agent, or Firm* — Tarolli, Sundheim, Covell & Tummino LLP (57) ABSTRACT

A vehicle driver assist system includes a housing having a main body portion and a viewing window in the main body portion. A camera is provided in the main body portion and has a field of view through the viewing window. A glare reduction portion is adjacent the camera. The glare reduction portion has a textured surface for attenuating light reflection off of the glare reduction portion and into the camera.

16 Claims, 10 Drawing Sheets

(56) References Cited

U.S. PATENT DOCUMENTS

| | | | |
|---|---|---|---|
| 2015/0256729 A1* | 9/2015 | Wato | H04N 5/2252 348/311 |
| 2016/0023620 A1* | 1/2016 | Matori | B60R 11/04 348/148 |
| 2016/0167595 A1* | 6/2016 | Kang | B60R 11/04 348/148 |
| 2016/0216595 A1 | 7/2016 | Carlson | |

* cited by examiner

VEHICLE DRIVER ASSIST SYSTEM

TECHNICAL FIELD

The present invention is directed to a vehicle driver assist system and, in particular, to a vehicle driver assist system having a textured surface for reducing glare.

BACKGROUND

A driver assist system ("DAS") for vehicles is known. One type of vehicle DAS uses a forward facing camera. The camera is mounted in a housing that is secured to the front windshield of the vehicle to provide a forward looking field of view in front of the vehicle. Such forward facing vehicle DAS arrangements monitor the vehicle's forward operating environment and provide other vehicle systems with the monitored environment information to aid in a safer operation of the vehicle. For example, the vehicle DAS can monitor lane departure, assist in maintaining a vehicle in a road lane, provide lane centering/guidance, control operation of the high and/or low beam headlights, detect vehicle presence, provide forward crash warning, perform sign recognition, and/or apply automatic emergency braking in response to the detection of a pedestrian.

A vehicle DAS controller is connected to an output of the camera and analyzes the images output data from the camera. Sunlight, high beam headlights, and/or other external light sources can cause degradation of the camera image in regard to contrast and quality. To ensure that the camera of the vehicle DAS accurately perceives the environment within its field of view, it is desirable to reduce glare caused by sunlight or other external light sources that could affect the camera image, which may result in an improper image analysis. One proposal for glare reduction involves the use of low gloss paint or low gloss material. However, it is desired to provide a more cost effective solution.

SUMMARY OF THE INVENTION

In accordance with one aspect of the present invention, a vehicle driver assist system includes a housing having a main body portion and a viewing window in the main body portion. A camera is provided in the main body portion and has a field of view through the viewing window. A glare reduction portion is adjacent the camera. The glare reduction portion has a textured surface for attenuating light reflection off of the glare reduction portion and into the camera.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

A vehicle driver assist system ("DAS") 10 in accordance with one example embodiment of the present invention is shown in FIGS. 1-7. The vehicle DAS 10 includes a housing 20. The housing 20 has a main body portion 22 having a mounting face 24. A camera 26 is mounted within the main body portion 22. The camera 26 includes a lens 28 extending out from the main body portion 22 into a camera viewing window 40.

Figure 1:
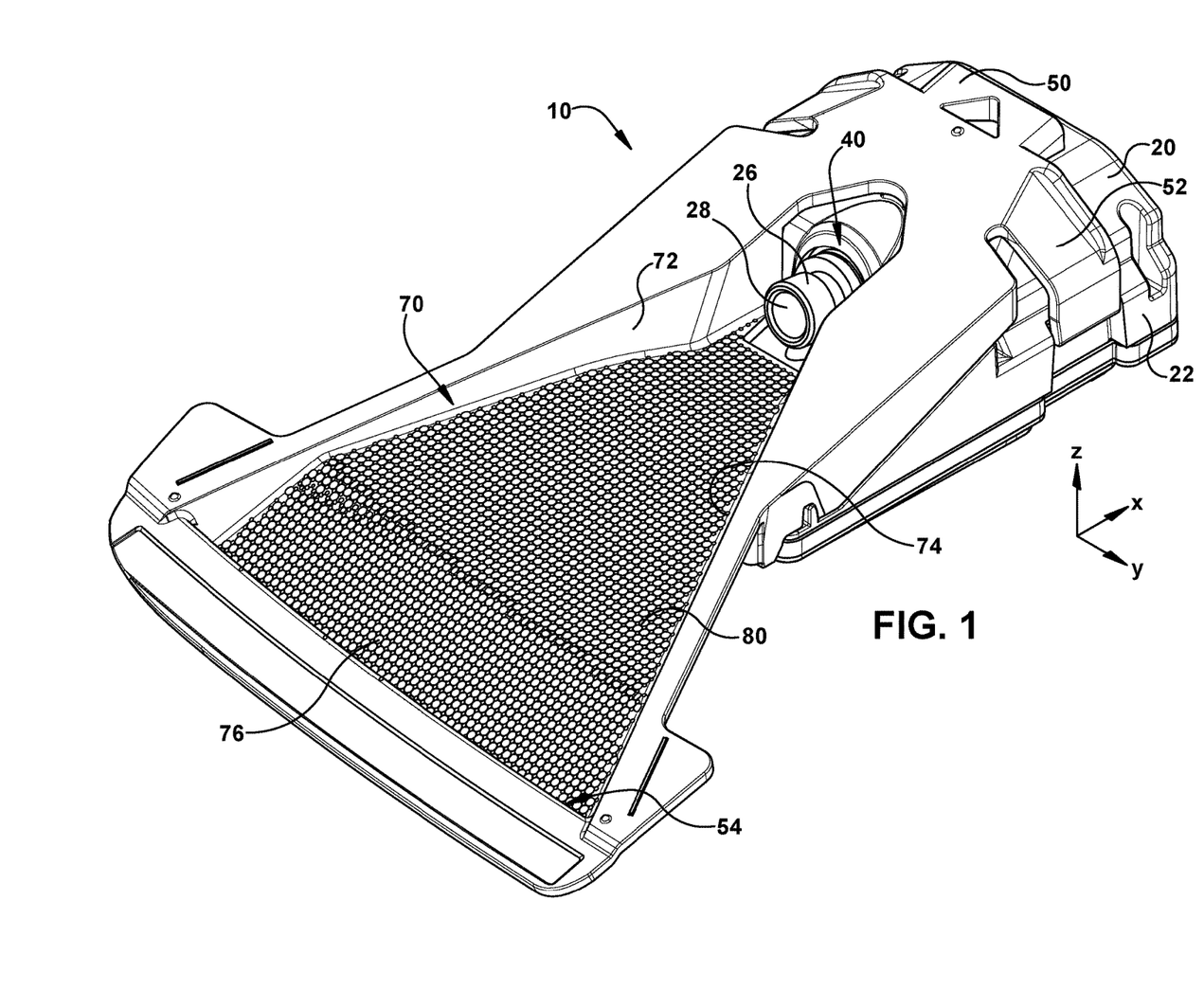
FIG. 1 is a perspective view of a driver assist system made in accordance with one example embodiment of the present invention.
Figure 2:
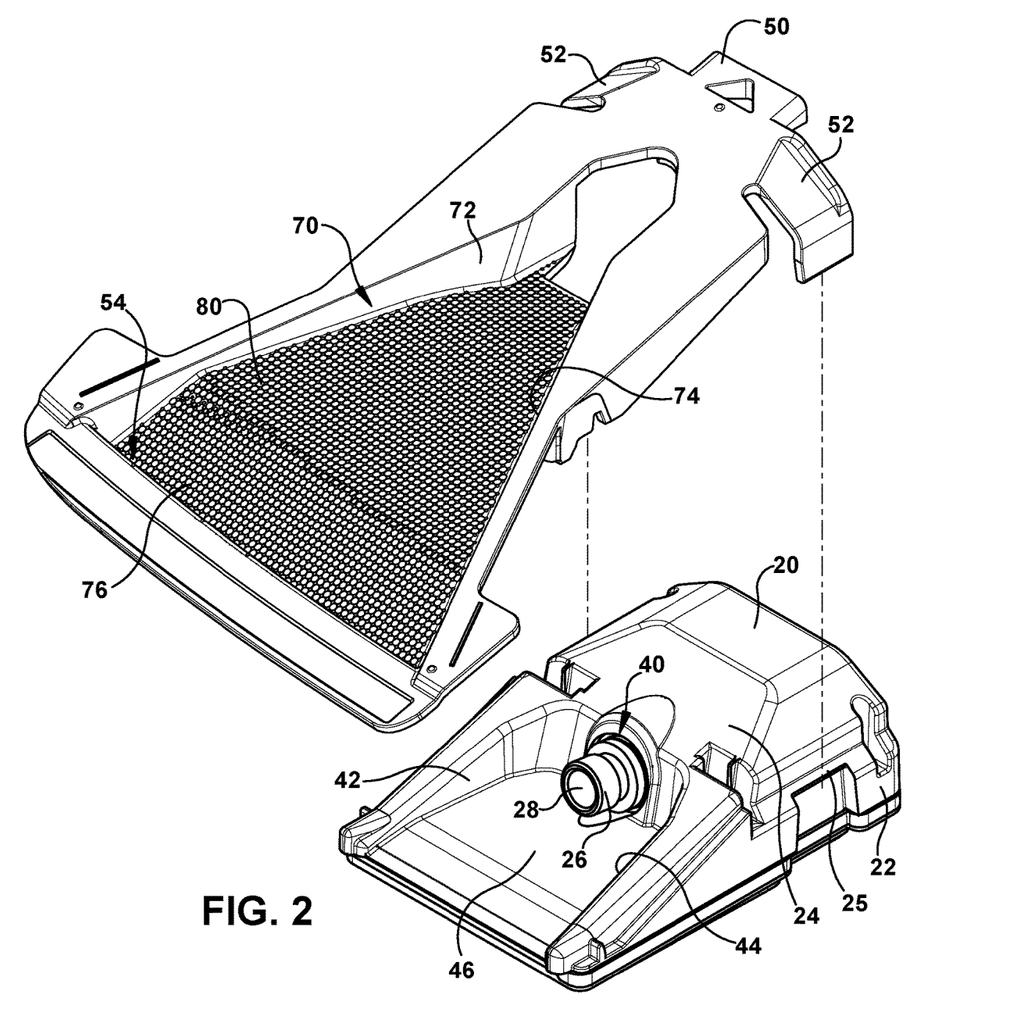
FIG. 2 is an exploded view of the driver assist system of FIG. 1.

The camera viewing window 40 is provided on the mounting face 24. The camera viewing window 40 is defined by spaced apart sidewalls 42, 44 and a bottom wall 46. The sidewalls 42, 44 extend away from the mounting face 24. The bottom wall 46 extends between and interconnects the sidewalls 42, 44.

Figure 3:
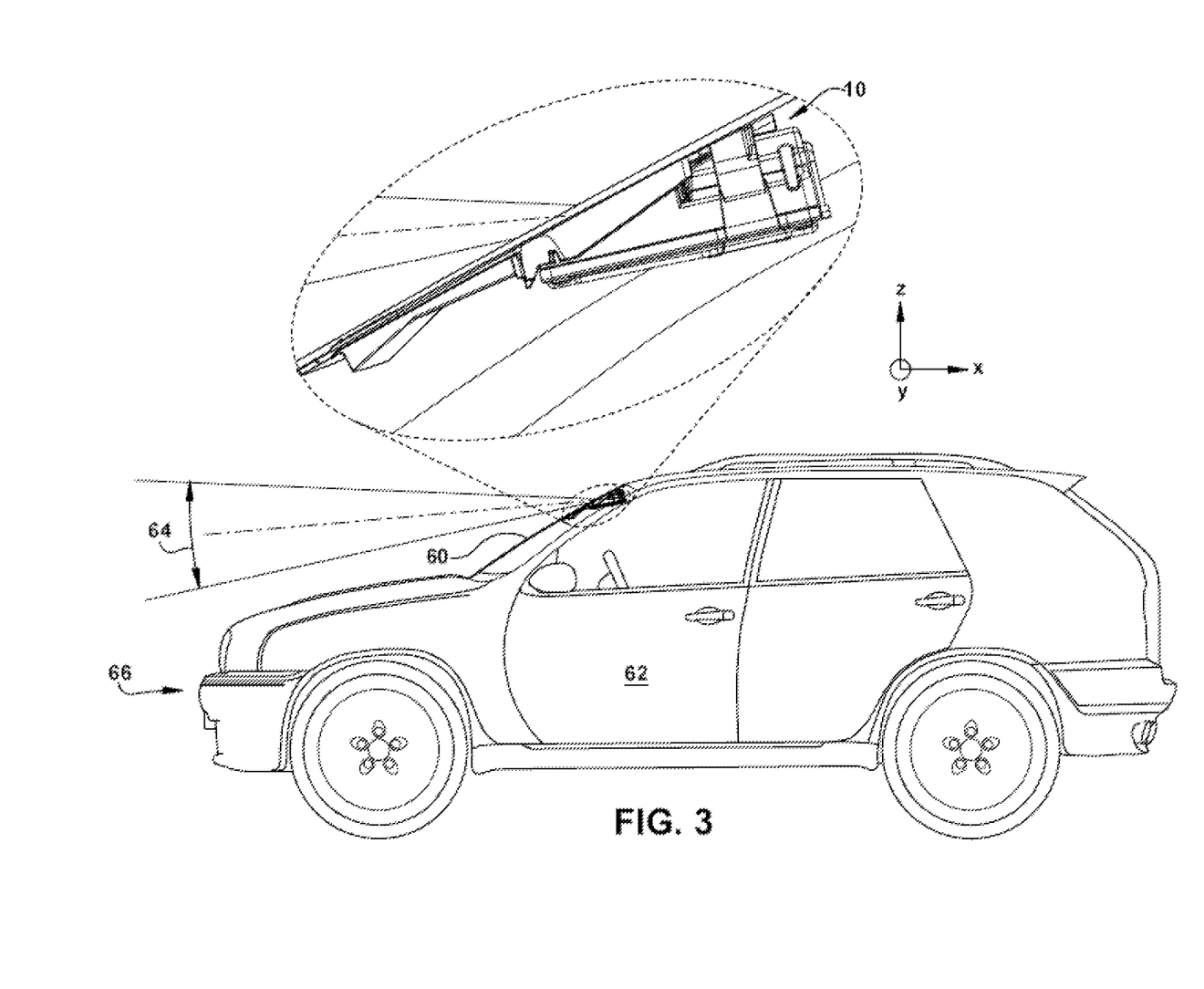
FIG. 3 is a side view of the driver assist system of FIG. 1 shown secured to a windshield of a vehicle.
Figure 4:
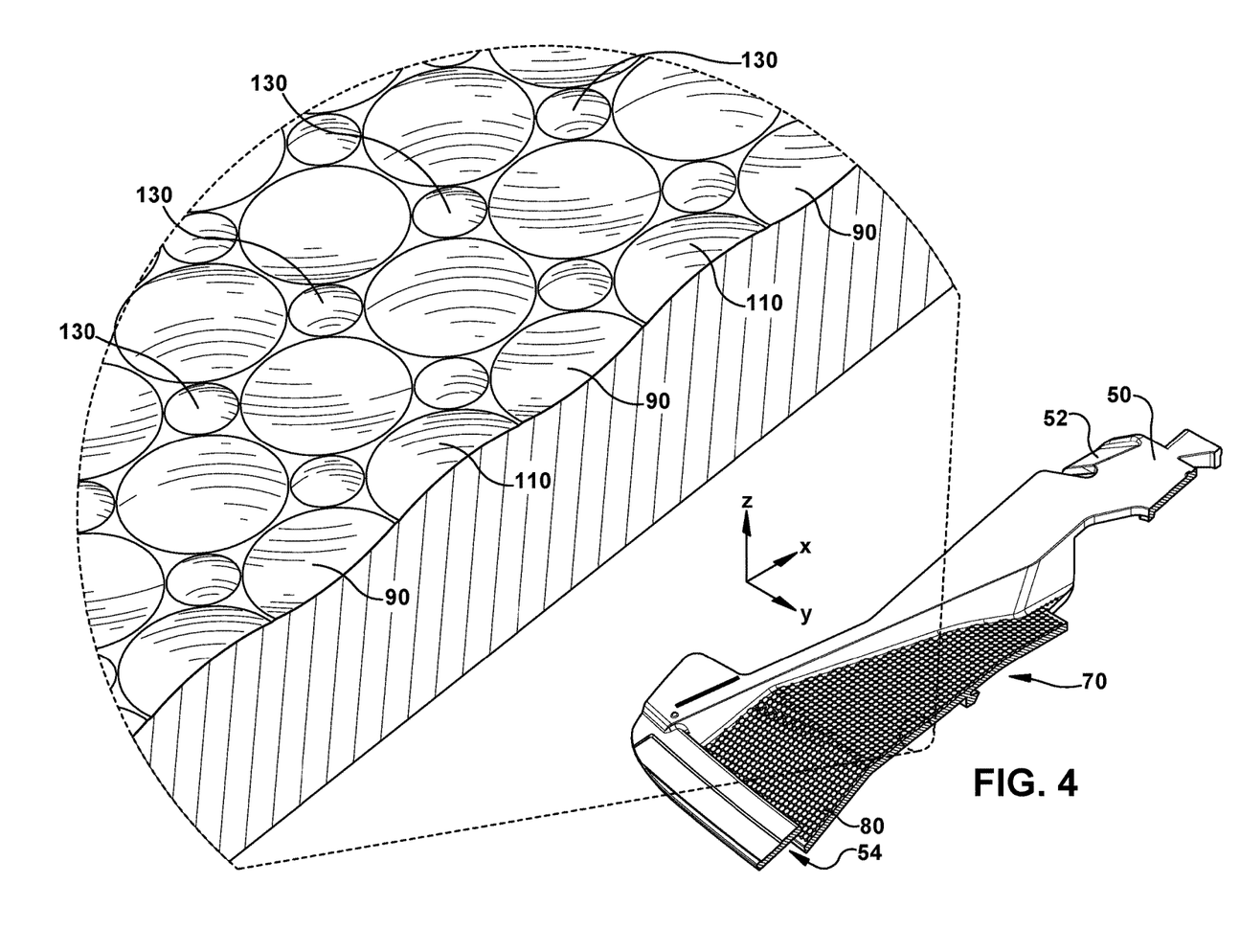
FIG. 4 is a perspective view of a portion of the driver assist system of FIG. 1 and a detail view of part of that portion.

The vehicle DAS 10 includes a mounting bracket 50. The mounting bracket 50 has resilient arms 52 that engage ribs 25 on the housing 20 to secure the housing 20 to the mounting bracket 50. The mounting bracket 50 is configured to be mounted to a windshield 60 of a vehicle 62 (see FIG. 3), thereby mounting the housing 20, and thus the camera 26, to the windshield 60. When attached to the windshield 60 of the vehicle 62 using the associated mounting bracket 50 (as shown in FIG. 3), the camera 26 has a forward facing field of view 64 relative to the front 66 of the vehicle 62. Although the embodiment of FIGS. 1-7 is described with reference to a vehicle DAS having a forward looking camera arrangement, it is contemplated that the vehicle DAS may have a different field of view (e.g., a rearward facing camera arrangement, a side-ward facing camera arrangement, or a vehicle interior facing camera arrangement).

The mounting bracket 50 includes a vent 54. The vent 54 is configured to facilitate airflow to the camera 26. The airflow may assist in defogging the lens 28 and/or convection cooling for regulating the operating temperature of the vehicle DAS 10.

The mounting bracket 50 includes spaced apart sidewall panels 72, 74 and a bottom wall panel 76. The bottom wall panel 76 interconnects and extends between the sidewall panels 72, 74. The sidewall panels 72 and the bottom wall panel 76 are received by the camera viewing window 40. Specifically, when the housing 20 is attached to the mounting bracket 50, the sidewall panels 72, 74 abut the sidewalls 42, 44, respectively, and the bottom wall panel 76 abuts the bottom wall 46. The panels 72, 74, 76 are shaped to have substantially the same profile as the profile of the respective wall portions 42, 44, 46 against which each panel 72, 74, 76 abuts.

The DAS 10 is provided with a glare reduction portion 70 adjacent the camera 26. The glare reduction portion 70 is configured to attenuate the reflection of light off of the glare reduction portion 70 and into the lens 28. The glare reduction portion 70 includes a textured surface 80. The textured surface 80 may be provided on the bottom wall panel 76 of the mounting bracket 50.

A portion of the textured surface 80 is shown in FIGS. 4-7. For the purposes of this disclosure, the arrangement of the textured surface 80 will be made with reference to a three dimensional Cartesian coordinate system (x, y, z). The orientation of the axes of the coordinate system (x, y, z) with respect to the DAS 10 is illustrated in FIGS. 1 and 3-5.

The textured surface 80 includes a plurality of first features 90, a plurality of second features 110, and a plurality of third features 130. Each of the first features 90 is a circular concave dimple. The first features 90 have a first diameter 94 and a depth 96. Each of the second features 110 is a circular convex protrusion. The second features 110 have a second diameter 114 and a first height 116. The first diameter 94 is equal to the second diameter 114, and the depth 96 is equal to first height 116. Each of the third features 130 is a circular convex dimple. The third features 130 have a third diameter 134 and a second height 136. The third diameter 134 is less than the second diameter 114, and the second height 136 is greater than the first height 116 (the height of third features 130 is exaggerated in FIGS. 6 and 7 to clearly illustrate the height differences between the second features 110 and the third features).

Figure 5:
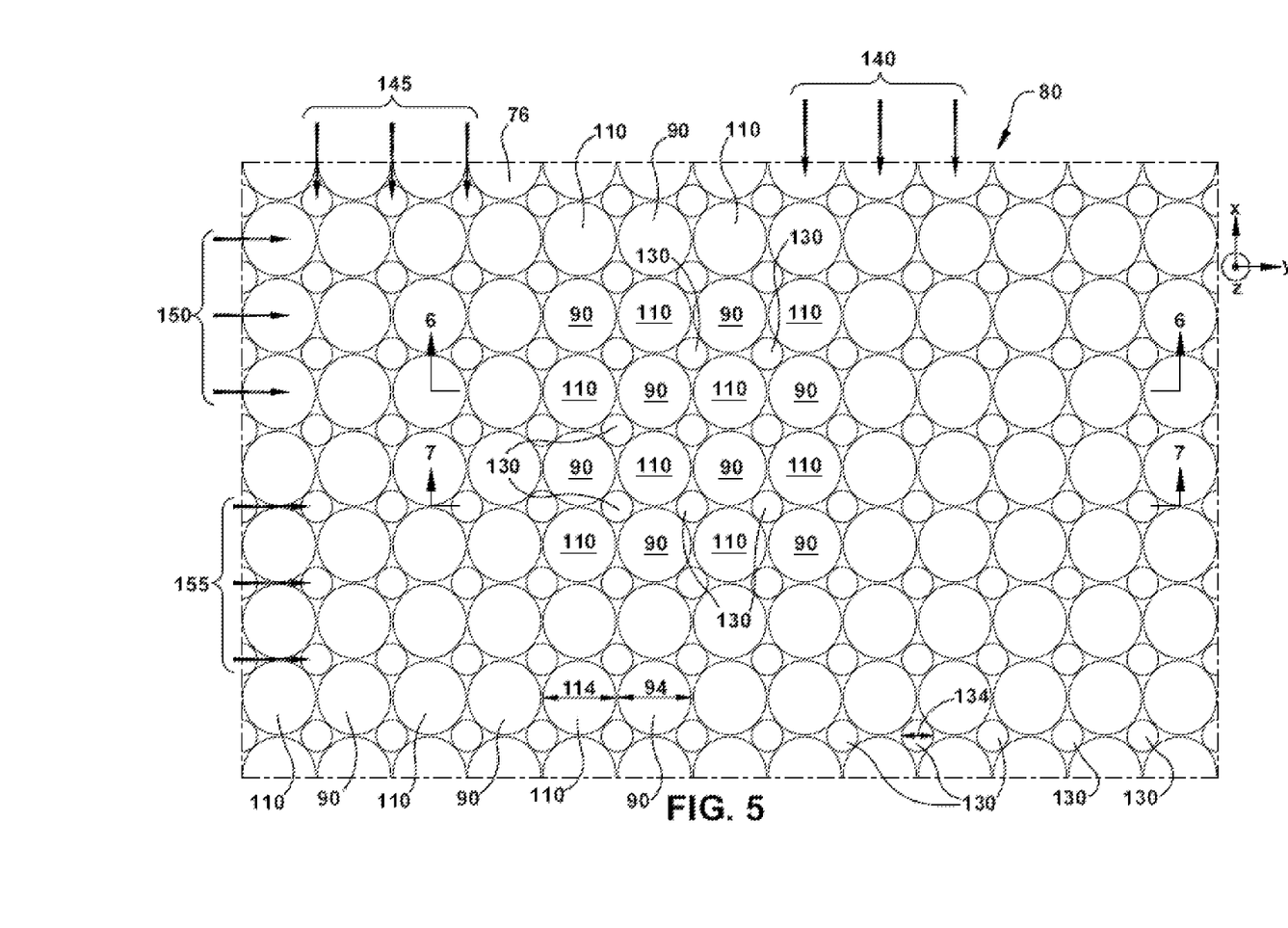
FIG. 5 is a plan view of a portion of the driver assist system of FIG. 1.
Figure 6:
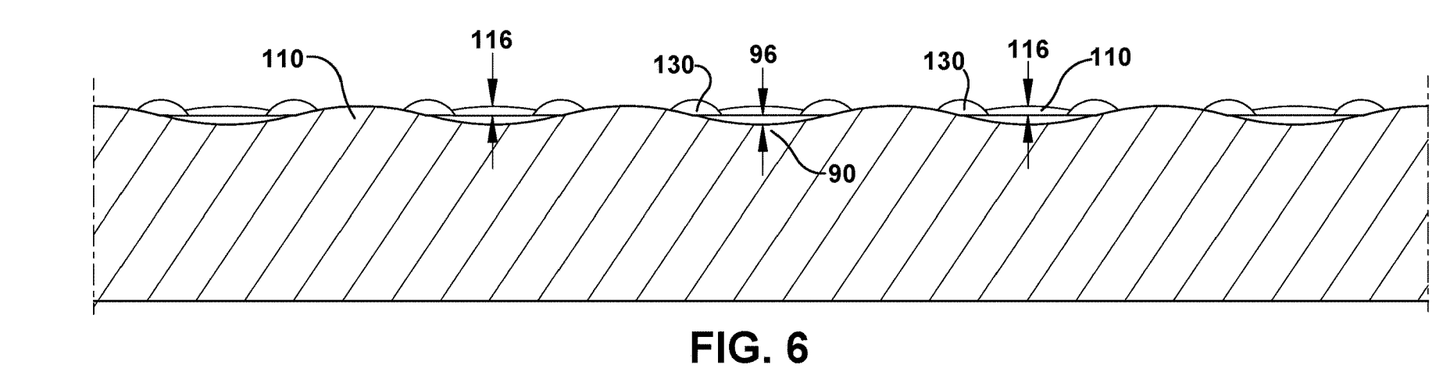
FIG. 6 is a sectional view along 6-6 of FIG. 5.
Figure 7:
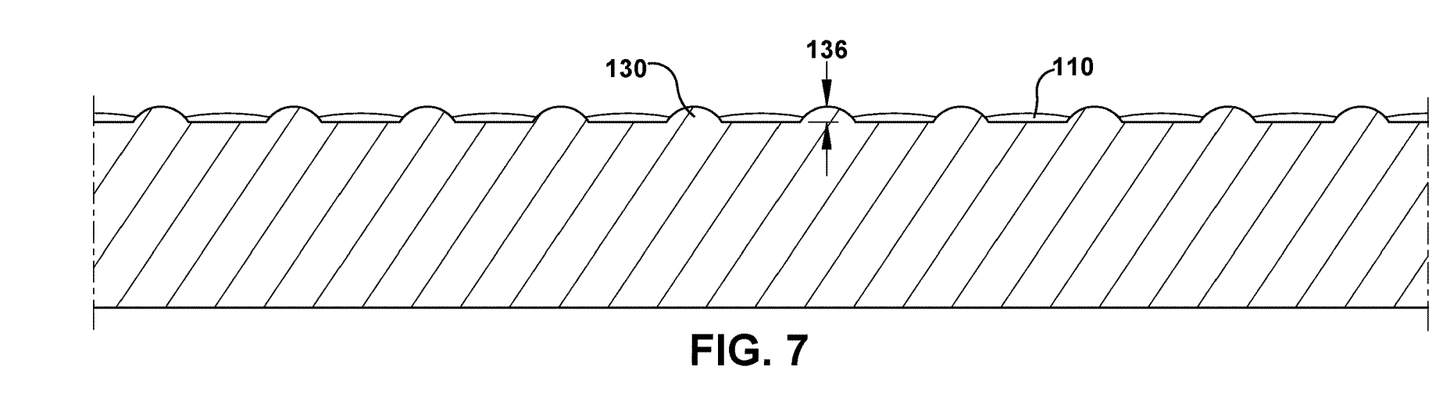
FIG. 7 is a sectional view along 7-7 of FIG. 5.

The first features 90 and the second features 110 are aligned in columns 140 that extend along the X-axis and rows 150 that extend along the Y-axis. The first features 90 and the second features 110 alternate along the X-axis as well as the Y-axis. The columns 140 have a repeating pattern of a first feature 90 followed by a second feature 110. Similarly, along the rows 150 there is a repeating pattern of a first feature 90 followed by a second feature 110. The third features 130 are likewise aligned in columns 145 that extend along the X-axis and rows 155 that extend along the Y-axis. The columns 145 and the rows 155 of the third features 130 are interspersed between the columns 140 and the rows 150 of the combined first and second features 90, 110. That is, moving along the Y-axis there is a column 140 of combined first and second features 90, 110 followed by a column 145 of third features 130. Similarly, moving along the X-axis there is a row 150 of combined first and second features 90, 110 followed by a row 155 of third features 130.

Although the textured surface 80 is shown as being on only the bottom wall panel 76, it is contemplated that the sidewall panels 72, 74 may also be provided with the same textured surface. Additionally, it is contemplated that the sidewall panels 72, 74 may have a textured surface that is different than the textured surface of the bottom wall panel 76. It is further contemplated that each of the three panels 72, 74, 76 may have a combination of different surfaces (e.g., textured or smooth) on each of the panels.

The effect of the textured surface 80 on light reflection will now be described with reference to Table 1, provided below. Table 1 illustrates the effect of different surface finishes (textured surface, velvethane painted surface, un-textured surface) on light reflection off of the surface and into the camera 26 at various angles of incidence of light.

TABLE 1

| | | Type of Surface Finish | | |
| --- | --- | --- | --- | --- |
| | | Textured Surface | Velvethane Painted Surface | Un-textured Surface |
| Angle of Incidence | 20° | 0.2% | 0.1% | 1.2% |
| | 60° | 1.4% | 0.4% | 13.7% |
| | 85 | 2.1% | 2.7% | 45.1% |

When the angle of incidence of the light is 20°, the textured surface 80 reflects 0.2% of the light, the velvethane painted surface reflects 0.1% of the light, and the un-textured surface reflects 1.2% of the light. When the angle of incidence of the light is 60°, the textured surface 80 reflects 1.4% of the light, the velvethane painted surface reflects 0.4% of the light, and the un-textured surface reflects 13.7% of the light. When the angle of incidence of the light is 85°, the textured surface 80 reflects 2.1% of the light, the velvethane painted surface reflects 2.7% of the light, and the un-textured surface reflects 45.1% of the light. Thus, in most cases, the textured surface 80 performs substantially equally as well as the velvethane painted surface in regard to attenuating light reflection and, in at least one angle of incidence, performs better than the velvethane painted surface. Light reflection into the lens 28 is advantageously provided at a lower cost due to the fact that the textured surface 80 can be manufactured more cheaply than the application of a velvethane painted surface.

It is contemplated that the textured surface 80 may include any number of different features and have any different number of feature arrangements. For example, the first, second, and third features 90, 110, 130 may be different than the above described embodiment in regard to heights/depths and/or diameters. As another example, the first, second, and third features 90, 110, 130 may be combined to produce different alignments along the X-axis and/or Y-axis and/or provide different repeating patterns. As another example, the textured surface 80 may include only the first feature 90 and the second feature 110. As yet another example, the textured surface 80 may include only the first feature 90 and the third feature 130. As yet even another example, the first, second, and/or third features 90, 110, 103 may be oval, ellipse, parallelogram, square, rectangle, triangle, rhombus, pentagon, hexagon, heptagon, octagon, nonagon, and/or decagon (as opposed to circular). It is contemplated that the textured surface 80 may also be a combination of, or further variations of, any one or more of the aforementioned arrangements.

Figure 8:
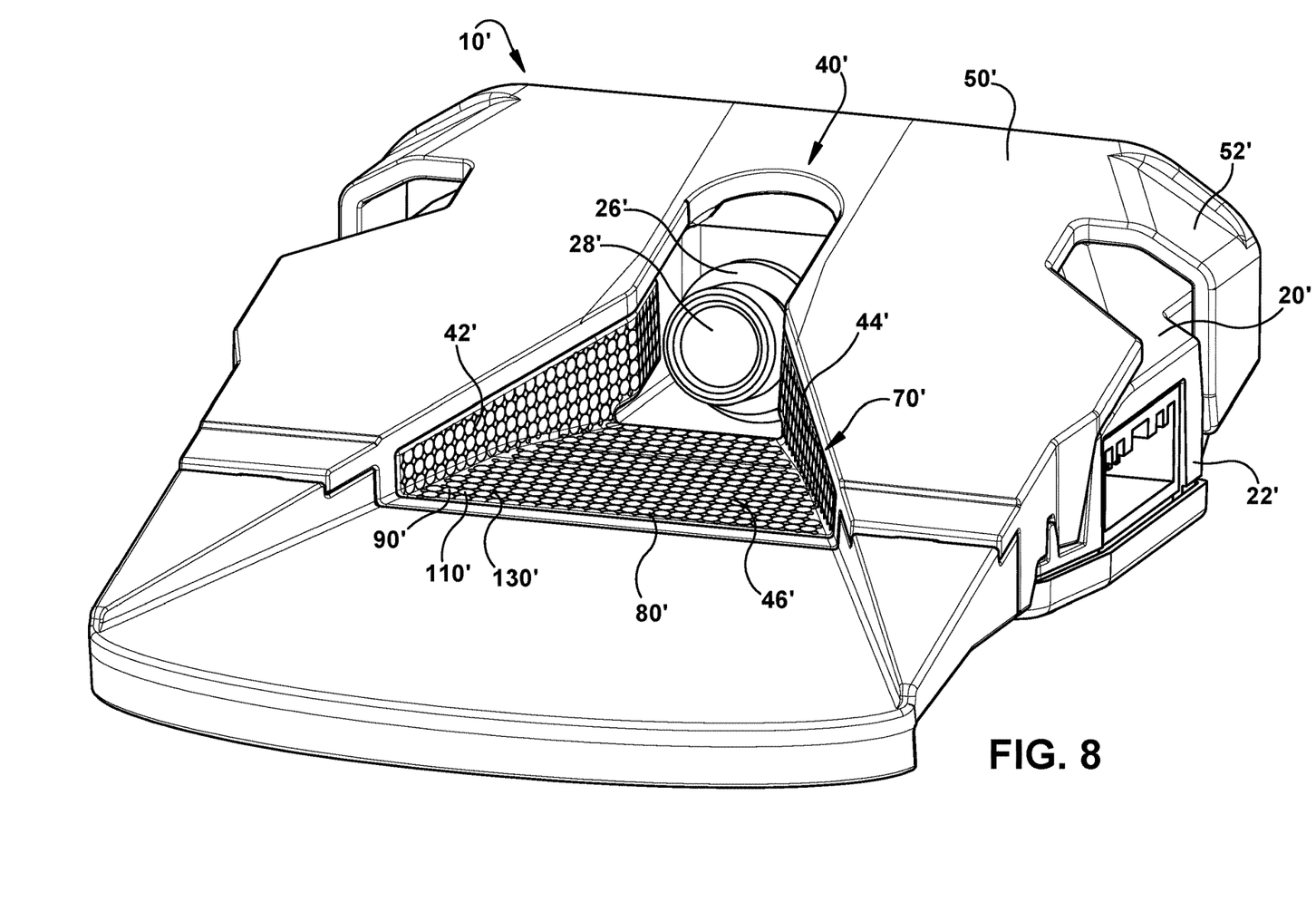
FIG. 8 is a perspective view of a driver assist system made in accordance with another example embodiment of the present invention.
Figure 9:
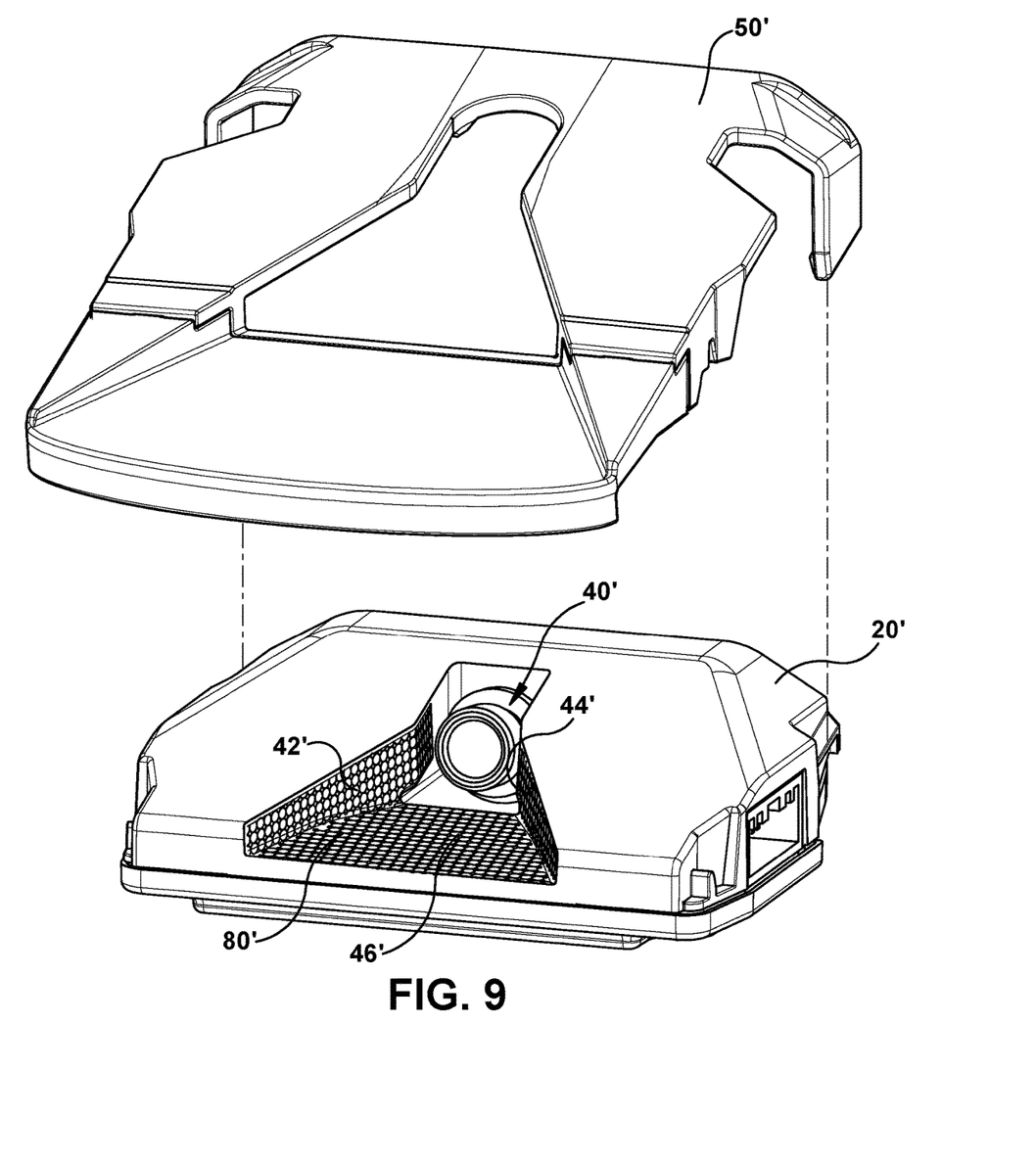
FIG. 9 is an exploded view of the driver assist system of FIG. 6.

Another example embodiment of the present invention is shown in FIGS. 8 and 9. The vehicle DAS 10' of FIGS. 8 and 9 is substantially similar to the vehicle DAS 10 of FIGS. 1-7. Features shared between the vehicle DAS 10' of FIGS. 8 and 9 and the vehicle DAS 10 of FIGS. 1-7 will be identified using the same reference numerals with the addition of a prime symbol in FIGS. 8 and 9.

Unlike the vehicle DAS 10 of FIGS. 1-7, the mounting bracket 50' of the vehicle DAS 10' of FIGS. 8 and 9 does not have a glare reduction portion. The textured surfaces 80' of the vehicle DAS 10' of FIGS. 8 and 9 are provided on the walls 42', 44', 46' of the housing 20' that define the camera viewing window 40'. Although the vehicle DAS 10' of FIGS. 8 and 9 is described with reference to the textured surfaces 80' being provided on the sidewalls 42', 44' and the bottom wall 46', it is contemplated that the sidewalls 42', 44' may have a textured surface that is different than the textured surface of the bottom wall 46'. It is further contemplated that that the sidewalls 42', 44' may have a smooth surface rather than a textured surface. It is even further contemplated that each of the three walls 42', 44', 46' may have a combination of different surfaces (e.g., textured or smooth) on each of the walls.

The plurality of first features 90', the plurality of second features 110', and the plurality of third features 130' that make up the textured surfaces 80' of the vehicle DAS 10' of FIGS. 8 and 9 are substantially similar to the plurality of first features 90, the plurality of second features 110, and the plurality of third features 130 that make up the textured surface 80 of the vehicle DAS 10 of FIGS. 1-7. It is contemplated that, similar to the vehicle DAS 10 of FIGS. 1-7, the plurality of first features 90', the plurality of second features 110', and the plurality of third features 130' that make up the textured surfaces 80' of the vehicle DAS 10' of FIGS. 8 and 9 may be defined by the different arrangements discussed above in regard to dimensions, patterns, alignments, shapes, or a combination or variation of any one or more of these arrangements.

Figure 10:
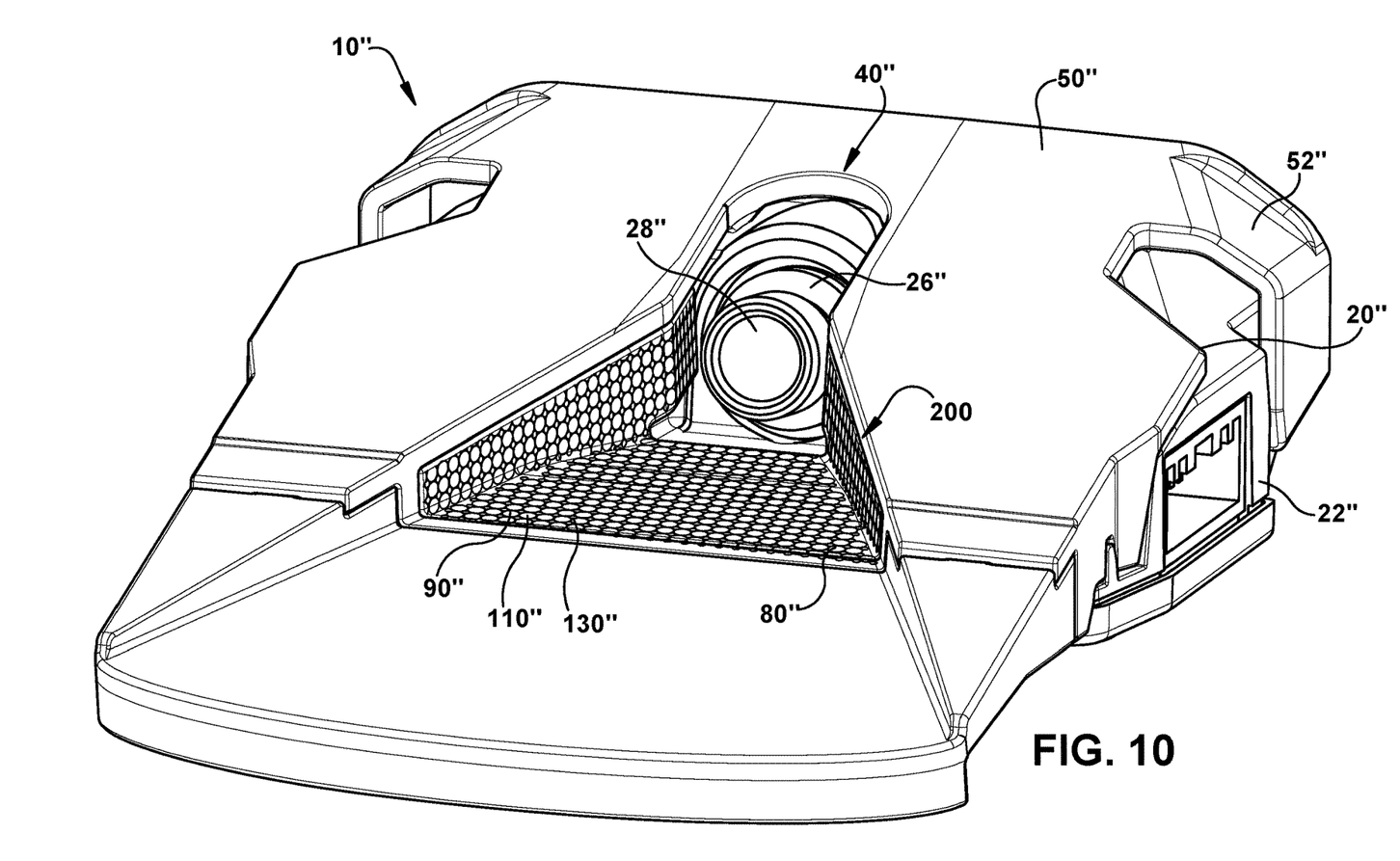
FIG. 10 is a perspective view of a driver assist system made in accordance with another example embodiment of the present invention.
Figure 11:
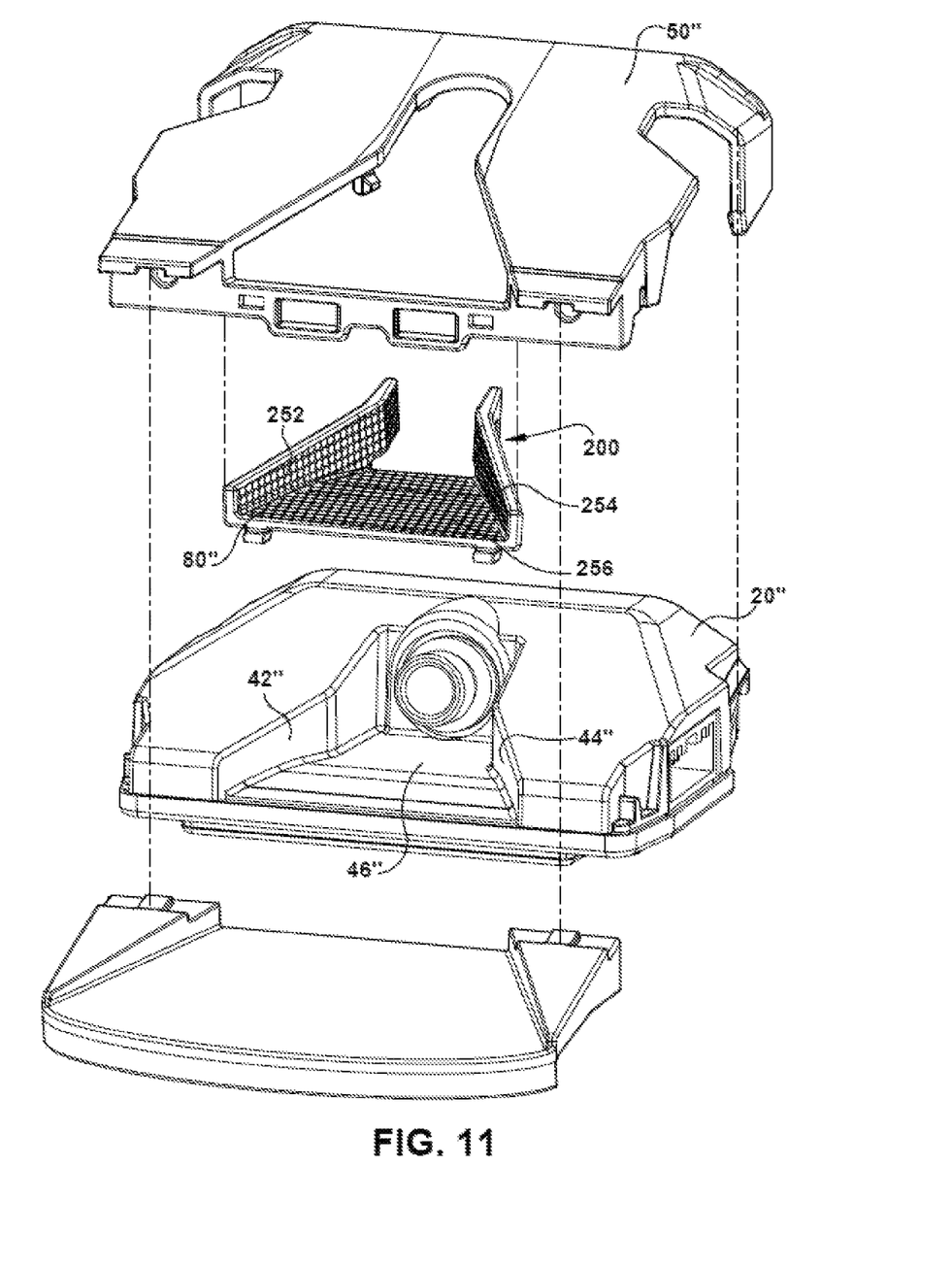
FIG. 11 is an exploded view of the driver assist system of FIG. 8.

A vehicle DAS 10" in accordance with another example embodiment of the present invention is shown in FIGS. 10 and 11. The vehicle DAS 10" of FIGS. 10 and 11 is substantially similar to the vehicle DAS 10 of FIGS. 1-7. Features shared between the vehicle DAS 10" of FIGS. 10 and 11 and the vehicle DAS 10 of FIGS. 1-7 will be identified using the same reference numerals with the addition of a double prime symbol in FIGS. 10 and 11.

Unlike the vehicle DAS 10 of FIGS. 1-7, the mounting bracket 50" of the vehicle DAS 10" of FIGS. 10 and 11 does not have a glare reduction portion. The textured surfaces 80" of the vehicle DAS 10" of FIGS. 10 and 11 are provided on a glare reduction shield 200 that is separate from the housing 20" and the mounting bracket 50". The glare reduction shield 200 has sidewall panels 252, 254 interconnected by a bottom wall panel 256. The glare reduction shield 200 is received in the camera viewing window 40". Specifically, the sidewall panels 252, 254 are attached to the sidewalls 42", 44", respectively, and the bottom wall panel 256 is attached to the bottom wall 46". The panels 252, 254, 256 have a profile that substantially mirrors the profile of the respective wall portions 42", 44", 46" to which each panel 252, 254, 256 is attached.

In accordance with one example embodiment, the glare reduction shield 200 is a one piece unit having appropriate snap connectors that are received in associated openings in the main body portion 22" so that the glare reduction shield 200 is securely held in the viewing window 40". It is contemplated that any other suitable attachment means may be employed (e.g., gluing). It is further contemplated that the panels 252, 254, 256 of the glare reduction shield 200 may be individual panels that are each separately attachable to the main body portion 22".

The textured surfaces 80" are specifically provided on the sidewall panels 252, 254 and the bottom wall panel 256. Although the vehicle DAS 10" of FIGS. 10 and 11 is described with reference to the textured surfaces 80" being provided on the sidewall panels 252, 254 and the bottom wall panel 256, it is contemplated that the sidewall panels 252, 254 may have a textured surface that is different than the textured surface of the bottom wall panel 256. It is further contemplated that that the sidewall panels 252, 254 may have a smooth surface rather than a textured surface. It is even further contemplated that each of the three panels 252, 254, 256 may have a combination of different surfaces (e.g., textured or smooth) on each of the walls.

The plurality of first features 90", the plurality of second features 110", and the plurality of third features 130" that make up the textured surfaces 80" of the vehicle DAS 10" of FIGS. 10 and 11 are substantially similar to the plurality of first features 90, the plurality of second features 110, and the plurality of third features 130 that make up the textured surface 80 of the vehicle DAS 10 of FIGS. 1-7. It is contemplated that, similar to the vehicle DAS 10 of FIGS. 1-7, the plurality of first features 90", the plurality of second features 110", and the plurality of third features 130" that make up the textured surfaces 80" of the vehicle DAS 10" of FIGS. 10 and 11 may be defined by the different arrangements discussed above in regard to dimensions, patterns, alignments, shapes, or a combination or variation of any one or more of these arrangements.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

Having described the invention, the following is claimed:

1. A vehicle driver assist system comprising:
   a housing having a main body portion and a viewing window in the main body portion;
   a camera provided in the main body portion having a field of view through the viewing window; and
   a glare reduction portion adjacent the camera, the glare reduction portion having a textured surface configured to attenuate a reflection of light off of the glare reduction portion and into the camera, the textured surface including a plurality of concave dimples and a plurality of convex protrusions.

2. The vehicle driver assist system according to claim 1, wherein the plurality of concave dimples includes at least two concave dimples having at least one of different shapes and different dimensions.

3. The vehicle driver assist system according to claim 1, wherein the plurality of concave dimples includes at least two concave dimples having different shapes and different dimensions.

4. The vehicle driver assist system according to claim 1, wherein at least one of the plurality of concave dimples and the plurality of convex protrusions is shaped as one of a circle, oval, ellipse, parallelogram, square, rectangle, triangle, rhombus, pentagon, hexagon, heptagon, octagon, nonagon, and decagon.

5. The vehicle driver assist system according to claim 1 comprising a mounting bracket for attaching the housing to a vehicle windshield, the textured surface being provided on the mounting bracket.

6. The vehicle driver assist system according to claim 5, wherein the mounting bracket includes spaced apart first and second sidewall panels and a bottom wall panel that interconnects and extends between the sidewall panels, the sidewall panels and the bottom wall panel being received by the camera viewing window, the textured surface being provided on at least one of the first sidewall panel, the second sidewall panel, and the bottom wall panel.

7. The vehicle driver assist system according to claim 1, wherein the textured surface is provided on the housing.

8. The vehicle driver assist system according to claim 7, wherein the housing includes a mounting face, the viewing window being defined by spaced apart first and second sidewalls that extend away from the mounting face and a bottom wall that interconnects and extends between the sidewalls, wherein the textured surface is provided on at least one of the first sidewall, the second sidewall, and the bottom wall.

9. The vehicle driver assist system according to claim 1 comprising a mounting bracket for attaching the housing to a vehicle windshield and a shield received in the housing, the shield being separate from the mounting bracket, the textured surface being provided on the shield.

10. The vehicle driver assist system according to claim 9, wherein the shield has spaced apart first and second sidewall panels and a bottom wall panel that interconnects and extends between the sidewalls, wherein the textured surface is provided on at least one of the first sidewall panel, the second sidewall panel, and the bottom wall panel.

11. The vehicle driver assist system according to claim 5, wherein the mounting bracket includes a vent configured to facilitate airflow to the camera.

12. The vehicle driver assist system according to claim 5, wherein the mounting bracket includes resilient arms that engage ribs on the housing to connect the housing to the mounting bracket.

13. The vehicle driver assist system according to claim 1, wherein a depth of the plurality of concave dimples is equal to a height of the plurality of convex protrusions.

14. The vehicle driver assist system according to claim 1, wherein a height of one of the plurality of convex protrusions is greater than a height of one other of the plurality of convex protrusions.

15. The vehicle driver assist system according to claim 1, wherein the plurality of concave dimples and the plurality of convex protrusions have an alternating arrangement in a first direction.

16. The vehicle driver assist system according to claim 15, wherein the plurality of concave dimples and the plurality of convex protrusions have an alternating arrangement in a second direction that is substantially perpendicular to the first direction.

* * * * *